(12) United States Patent
Manfred

(10) Patent No.: US 7,146,740 B2
(45) Date of Patent: *Dec. 12, 2006

(54) METHODS AND APPARATUS FOR AUTOMATIC MAGNETIC COMPENSATION

(75) Inventor: Mark T. Manfred, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/063,631

(22) Filed: Feb. 23, 2005

(65) Prior Publication Data

US 2005/0138825 A1 Jun. 30, 2005

Related U.S. Application Data

(63) Continuation-in-part of application No. 10/724,974, filed on Dec. 1, 2003, now Pat. No. 6,860,023.

(60) Provisional application No. 60/436,980, filed on Dec. 30, 2002.

(51) Int. Cl.
*G01C 17/38* (2006.01)

(52) U.S. Cl. .......................... 33/356; 33/351; 324/244; 701/207

(58) Field of Classification Search .................. 33/351, 33/352, 355 R, 356, 357; 324/244, 245; 701/207, 213, 224; 702/2, 92–94, 150–153, 702/189

See application file for complete search history.

(56) References Cited

U.S. PATENT DOCUMENTS

| | | |
|---|---|---|
| 4,030,204 A | 6/1977 | Edwards |
| 4,309,659 A | 1/1982 | Yoshii |
| 4,327,498 A | 5/1982 | Setter et al. |
| 4,611,293 A | 9/1986 | Hatch et al. |
| 4,622,644 A | 11/1986 | Hansen |
| 4,797,841 A | 1/1989 | Hatch |
| 4,807,462 A | 2/1989 | Al-Attar |
| 4,972,593 A | 11/1990 | Dahlen et al. |
| 5,039,945 A | 8/1991 | Webb |
| 5,046,031 A | 9/1991 | Wanous |
| 5,065,521 A | 11/1991 | Waldrop et al. |
| 5,131,154 A | 7/1992 | Schierbeek et al. |
| 5,161,311 A | 11/1992 | Esmer et al. |
| 5,321,893 A | 6/1994 | Engebretson |
| 5,331,561 A | 7/1994 | Barrett et al. |
| 5,564,193 A | 10/1996 | Brooks |
| 5,632,092 A | 5/1997 | Blank et al. |
| 5,644,851 A | 7/1997 | Blank et al. |
| 5,802,727 A | 9/1998 | Blank et al. |
| 5,850,624 A | 12/1998 | Gard et al. |
| 6,009,629 A | 1/2000 | Gnepf et al. |
| 6,173,501 B1 | 1/2001 | Blank et al. |
| 6,459,990 B1 | 10/2002 | McCall et al. |

(Continued)

*Primary Examiner*—G. Bradley Bennett
(74) *Attorney, Agent, or Firm*—Dina Khaled, Esq.; Armstrong Teasdale LLP

(57) ABSTRACT

A method for characterizing distortions in the earth's magnetic field caused by a vehicle having a magnetometer affixed therein is described. The method includes repeatedly measuring the distorted magnetic field utilizing the magnetometer and obtaining a three-dimensional orientation of the vehicle axes with respect to the earth at a time of each magnetometer measurement. The method also includes receiving undistorted earth magnetic field data for the vicinity of the vehicle relative to the earth at the time of each magnetometer measurement and characterizing distortions caused by one or more of the vehicle and magnetometer errors utilizing the magnetic field measurements, the orientations of the vehicle, and the undistorted earth magnetic field data.

22 Claims, 9 Drawing Sheets

U.S. PATENT DOCUMENTS

| | | |
|---|---|---|
| 6,462,540 B1 | 10/2002 | Kandori et al. |
| 6,543,146 B1 | 4/2003 | Smith et al. |
| 6,653,831 B1 | 11/2003 | Friend et al. |
| 6,860,023 B1 * | 3/2005 | Manfred et al. ............... 33/356 |
| 2002/0100178 A1 | 8/2002 | Smith et al. |
| 2003/0011359 A1 | 1/2003 | Ashe |
| 2003/0016010 A1 | 1/2003 | Kandori et al. |
| 2003/0167121 A1 | 9/2003 | Ockerse et al. |

* cited by examiner

METHODS AND APPARATUS FOR AUTOMATIC MAGNETIC COMPENSATION

CROSS REFERENCE TO RELATED APPLICATIONS

This application is a Continuation-in-Part Application of U.S. patent application Ser. No. 10/724,974, filed Dec. 1, 2003 now U.S. Pat. No. 6,860,023, which claims priority of Provisional Application Ser. No. 60/436,980 filed Dec. 30, 2002, both of which are hereby incorporated by reference.

BACKGROUND OF THE INVENTION

This invention relates generally to determination of direction through magnetic direction indication, and more specifically to methods and apparatus for compensation of magnetic direction indications to account for local magnetic disturbances.

Magnetic direction indicators (e.g., magnetic compasses, magnetometers) are typically compensated to account for local disturbances in an ambient magnetic field caused by nearby magnetic objects, for example, ferrous materials, and magnetic fields generated by electrical currents. Known compensation methods are both time consuming and expensive processes. These known compensation methods also provide a limited accuracy because the methods are typically optimized for only a single angle of magnetic inclination.

Some known modem electronic compasses utilize software or firmware algorithms for magnetic compensation, but even these devices generally require time-consuming manual compensation procedures to determine a set of optimum compensation coefficients for utilization when performing the algorithms. Some low precision magnetometers are also known to exist, which provide quick automatic compensation techniques, but these techniques only provide a low accuracy compensation. Other known electronic compasses utilize biasing circuits as part of a closed loop system to attempt to reduce effects of magnetic field disturbances. However, these compasses also incorporate initialization modes, which can be complex, and which must be repeated upon each usage of the compass.

BRIEF SUMMARY OF THE INVENTION

In one aspect, a method for characterizing distortions in the earth's magnetic field caused by a vehicle is provided. A magnetometer is affixed to the vehicle and the method comprises repeatedly measuring the distorted magnetic field utilizing the magnetometer and obtaining a three-dimensional orientation of the vehicle axes with respect to the earth at a time of each magnetometer measurement. The method also comprises receiving undistorted earth magnetic field data for the vicinity of the vehicle relative to the earth at the time of each magnetometer measurement and characterizing distortions caused by one or more of the vehicle and magnetometer errors utilizing the magnetic field measurements, the orientations of the vehicle, and the undistorted earth magnetic field data.

In another aspect, a method of compensating a magnetometer affixed to a vehicle to obtain accurate magnetic heading information for a vehicle orientation is provided. The method comprises using the magnetometer to measure a distorted earth magnetic field relative to axes of the vehicle, determining a pitch and roll orientation of the vehicle axes with respect to the earth, and calculating the distortion of the earth's magnetic field for any relative angle between the vehicle axes and the earth's undistorted magnetic field. The method further comprises determining a magnetic heading based on the magnetometer measurement, adjusted by the pitch and roll orientation of the vehicle, and compensated for distortions of the earth's magnetic field.

In yet another aspect, a method for determining a true earth magnetic field from a magnetic field measured by a magnetometer is provided. The method comprises generating a truth reference field vector, $h_i$, from inertial data and a three dimensional map of the earth's magnetic field, determining a difference between a vector as measured by the magnetometer and the truth reference vector, and utilizing the difference to estimate corrections to magnetometer model coefficients.

In still another aspect, a magnetic compass compensation unit for determining an orientation of a magnetometer within a vehicle relative to an undisturbed magnetic field of the earth is provided. The compensation unit comprises a processor configured to receive measurements of the distorted magnetic field from a magnetometer, receive an orientation of the vehicle axes with respect to the earth at a time corresponding to each magnetometer measurement, receive undistorted earth magnetic field data for the vicinity of the vehicle relative to the earth at the time corresponding to each magnetometer measurement, and characterize the distortions utilizing the magnetic field measurements, the orientations of the vehicle, and the undistorted earth magnetic field data.

In still yet another aspect, a processor programmed to generate a truth reference field vector, $h_i$, from inertial data and a three dimensional map of the earth's magnetic field is provided. The processor also determines a difference between a vector as measured by the magnetometer and the truth reference vector, and utilizes the difference to estimate corrections to magnetometer model coefficients.

DETAILED DESCRIPTION OF THE INVENTION

Methods and apparatus are herein described which automatically compensate a magnetic compass (e.g. a magnetometer) for local disturbances in the earth's magnetic field caused by a vehicle during normal vehicle operations. The methods and apparatus eliminate, or greatly reduce, time and expense associated with known methods for determination of magnetic compensation coefficients. Further, the methods and apparatus provide highly accurate, three dimensional compensation coefficients that are valid over all combinations of vehicle pitch, vehicle roll, vehicle heading, magnetic inclination, and magnetic declination.

Figure 1:
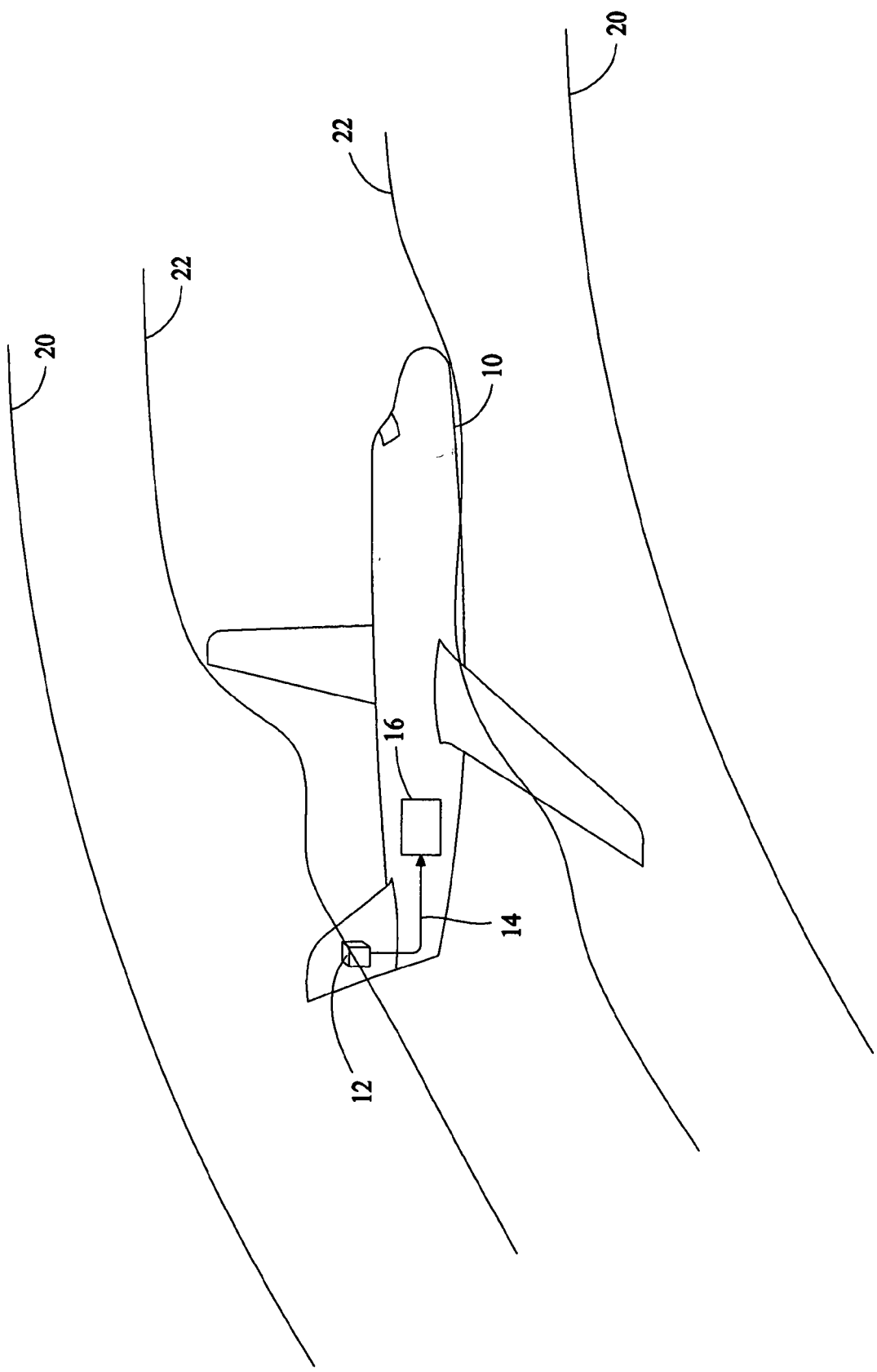
FIG. 1 is an illustration of a magnetometer in a vehicle passing through, and disturbing, a magnetic field.

FIG. 1 illustrates an vehicle 10 equipped with a magnetometer 12 providing magnetic field strength signals 14. In one embodiment, magnetometer 12 provides magnetic field strength signals 14 representing a measurement of the earth's magnetic field to a magnetic compass compensation unit 16, which may be part of an aircraft navigation system, for example. Magnetometer 12 includes three magnetic sensors (shown in FIG. 2) placed in different orientations from one another. In a specific embodiment, magnetic sensors are placed such that each sensor is linear with one of the three orthogonal axes of vehicle 10. Magnetic field lines 20 are shown a distance from vehicle 10, and are not disturbed by presence of vehicle 10. Magnetic field lines 22 however, are disturbed by the presence of vehicle 10. Magnetic field lines 20 and 22 are used to illustrate a presence of the earth's magnetic field. The disturbance to the earth's magnetic field is illustrated by the non-uniformities in magnetic field lines 22. The disturbed magnetic field passes through magnetometer 12 which causes sensors to react, based on a magnetic field strength passing across each sensor. Therefore, magnetic field strength signals 14 are inaccurate because of the presence of vehicle 10. In one embodiment, magnetometer 12 is a solid state magnetometer.

As is known, magnetic field lines 20 and 22 are representative of magnetic field strength. Lines closer together represent a stronger magnetic field strength, and lines farther apart represent a weaker magnetic field. The Earth's magnetic fields originate from the earth's magnetic north and south poles, and for the most part are uniform. However, and as described above, ferrous materials or other magnetic field sources may interfere with or disturb the earth's magnetic field. Such a disturbance might well be represented by magnetic field lines 22 changing direction in the immediate vicinity of a disturbing source, i.e. vehicle 10. Trying to determine magnetic heading of vehicle 10 based upon magnetic fields disturbed by vehicle 10 is prone to error.

Figure 2:
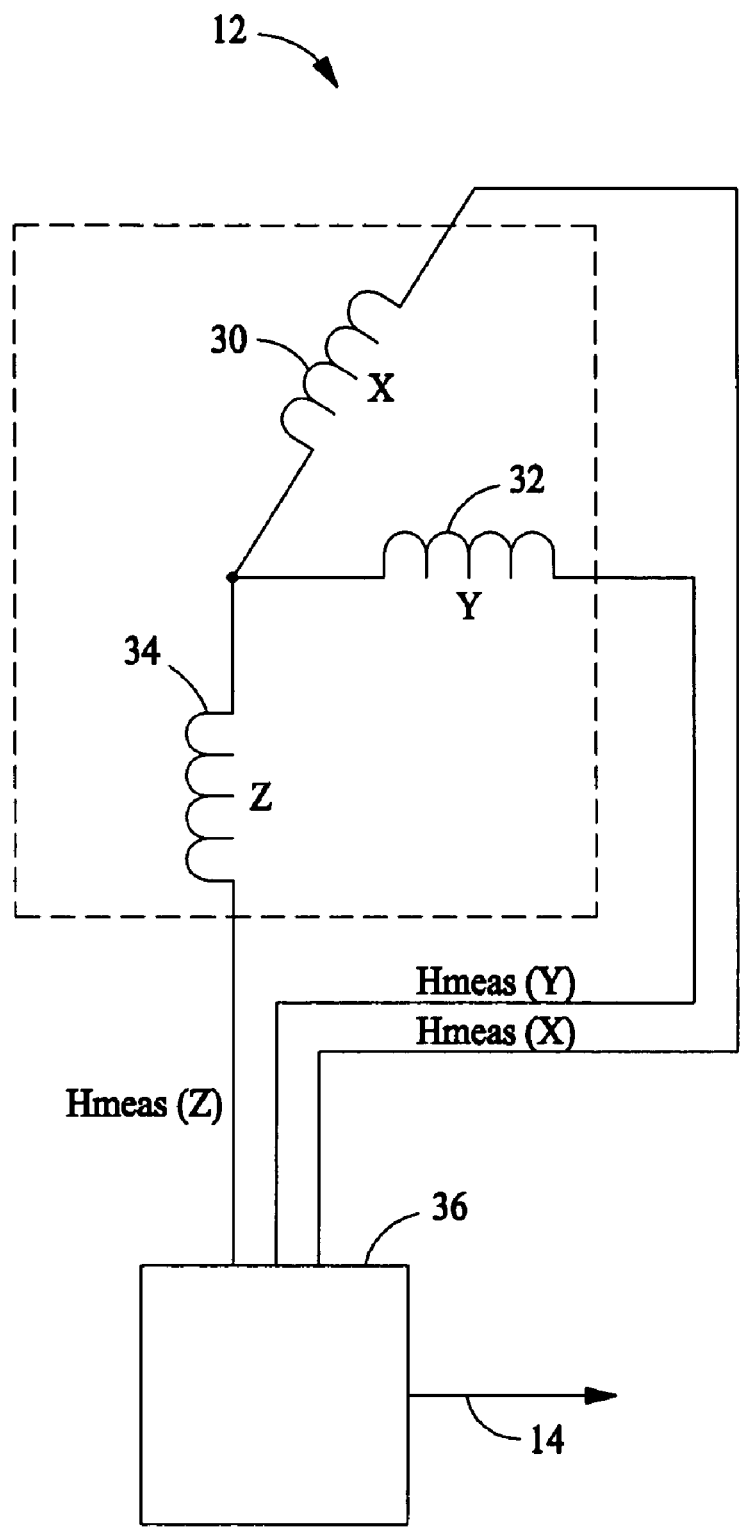
FIG. 2 is a detailed diagram of a magnetometer.

FIG. 2 is a detailed diagram of magnetometer 12. Magnetometer 12 includes an x-axis magnetic sensor 30, a y-axis magnetic sensor 32, and a z-axis magnetic sensor 34 each in a respective orthogonal axis of vehicle 10. Sensors 30, 32, and 34 generate a signal based on strength of a magnetic field through which sensors 30, 32, and 34 pass. Sensors 30, 32, and 34 are situated orthogonally, and the induced signal will be different for each axes, allowing determination of a three dimensional orientation of the disturbed magnetic field relative to orientation of vehicle 10. In one embodiment, magnetic sensors 30, 32, and 34 provide signals to an interface unit 36 which modifies signals from sensors 30, 32, and 34 for transmission to magnetic compensation unit 16 (shown in FIG. 1). While sensors 30, 32, and 34 are shown and described as being orthogonal to one another, the methods and apparatus described herein are applicable to sensor configurations where at least three sensors are each oriented in a unique direction, not necessarily orthogonal and not necessarily along vehicle axes, which allow determination of compensation coefficients in a moving vehicle as further described below. Other embodiments exist where only two magnetic sensors are utilized.

Figure 3:
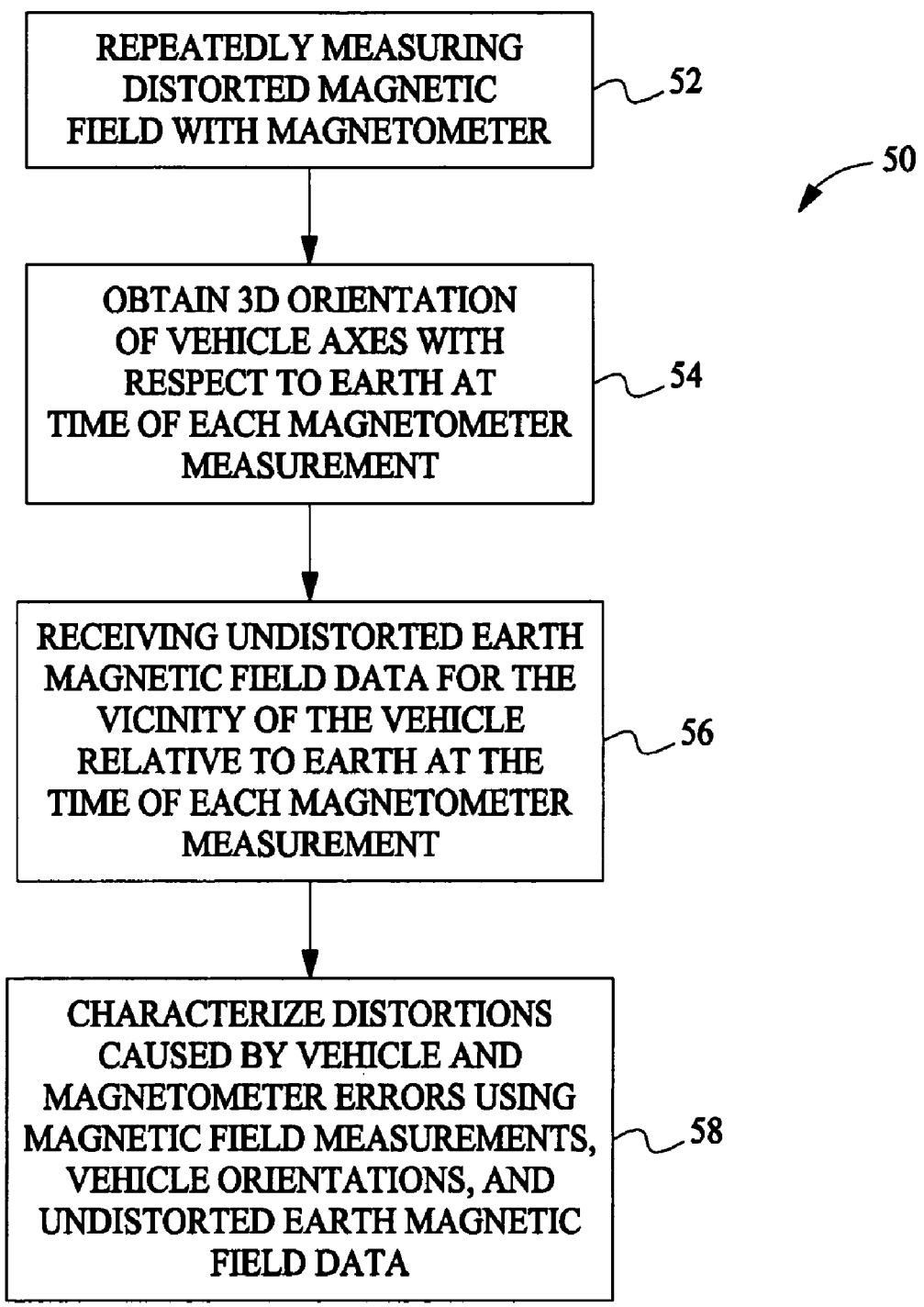
FIG. 3 is a flow diagram of a method for characterizing distortions in the earth's magnetic field caused by a vehicle.

FIG. 3 is a flow diagram 50 which illustrates a method performed by magnetic compass compensation unit 16 to characterize distortions in the earth's magnetic field caused by vehicle 10. The method is utilized to determine an orientation of magnetometer 12 relative to an undisturbed magnetic field of the earth, where magnetometer 12 within a vehicle 10 which causes a disturbance to the magnetic field of the earth. Referring to flow diagram 50, the distorted magnetic field is repeatedly measured 52 utilizing magnetometer 12. A three-dimensional orientation of the vehicle axes is then obtained 54 with respect to the earth at a time of each magnetometer measurement. Undistorted earth magnetic field data for the vicinity of vehicle 10 relative to the earth at the time of each magnetometer measurement is received 56. Distortions caused by either or both of vehicle 10 and magnetometer errors are characterized 58 utilizing the magnetic field measurements, the orientations of the vehicle, and the undistorted earth magnetic field data.

In one embodiment, signals 14 from magnetometer 12 are calibrated by unit 16 according to $h_{earth} = L_e * h_{meas} + h_{pe}$ where, $h_{earth}$ is a three-dimensional vector for the undistorted Earth's magnetic field, $h_{meas}$ is a three-dimensional vector for the distorted Earth's magnetic field as measured by magnetometer 12, $L_e$ is a three by three (3×3) matrix of magnetic correction coefficients, which includes, for example, nine correction coefficients, and $h_{pe}$ is a three-dimensional vector of magnetic correction coefficients which includes, for example, three correction coefficients. Signals 14 from magnetometer 12, $h_{meas}$, are multiplied using a multiplication function by magnetic correction coefficients, referred to herein as $L_e$ which is the aforementioned three by three matrix of magnetic correction coefficients. The product of the multiplication is added, using an addition function, to $h_{pe}$, which is a three-dimensional vector of magnetic correction coefficients to provide a magnetic heading which is compensated for local disturbances to the magnetic field of the earth, for example, caused by the presence of a vehicle.

Magnetic correction coefficients, or $L_e$ and $h_{pe}$, are estimated by comparing the three-dimensional magnetic field strength matrix, $h_{meas}$, as measured by magnetometer 12, against a three-dimensional magnetic truth system (not shown). A magnetic truth system provides an independent means to determine orientation of the Earth's undisturbed magnetic field relative to the orientation of magnetometer 12. The undisturbed Earth's magnetic field for a location can be determined from a geographic map of magnetic inclinations and declinations, assuming vehicle position is known through GPS or other means. Pitch and roll orientations of vehicle 10 can be determined by an attitude heading reference system (AHRS). Other sources of pitch and roll signals include, but are not limited to, an attitude reference system, an inertial reference system, and an inertial reference unit. The true heading orientation of vehicle 10 is provided through utilization of one of at least four different methods, and then transforming undistorted magnetic field components to distorted magnetic field components over relative orientations between the undistorted magnetic field and one or more of the axes of vehicle 10 and the axes of magnetometer 12.

One method for determining true heading involves a vehicle equipped with GPS. GPS is utilized to determine a true heading while the vehicle is moving by assuming true heading equals GPS track angle. The method assumes the vehicle's wheels are aligned with a longitudinal axis of the vehicle and that the vehicle is not turning or side slipping. However, effects of turns during movement are easily compensated by knowing the geometry of, for example, aircraft landing gears and by measuring GPS velocities and/or the yaw rate as determined by aircraft gyroscopes.

A second method for determining true heading involves a vehicle equipped with GPS and an Attitude and Heading Reference System (AHRS). Well-known AHRS algorithms are utilized to calculate a true heading while the vehicle is experiencing horizontal accelerations, including centrifugal accelerations caused by turns. These AHRS algorithms can continue to determine a true heading for a limited time duration after the acceleration stops, on the order of minutes.

If the vehicle has an Inertial Reference System (IRS), then a third method for determining true heading involves use of a true heading signal received directly from the IRS. An alternative is a synthesized magnetic heading signal from the IRS. A fourth method for determining true heading is utilization of a dual antenna GPS, from which true heading can be directly calculated.

Twelve coefficients, including nine magnetic correction coefficients and three vector of magnetic correction coefficients, are calculated using several methods. A preferred embodiment is to populate a three-dimensional magnetic error table with data during normal aircraft operations. The magnetic error table, in one embodiment, maintains separate data points for multiple orientations of the earth's actual magnetic field with respect to vehicle pitch, roll, and yaw axes. For example, the magnetic error table may include separate data points at 30 degree increments in yaw and at 60 degree increments in pitch and roll. In such an embodiment, the magnetic error table is configured with 216 data points. Each data point is a three-dimensional vector of magnetic error relative to the vehicle axes. Therefore, magnetic error table includes 648 scalar values. The data at each data point, in one embodiment, is low pass filtered, with a time constant of several hours. The low pass filtering occurs during a period when the orientation of the actual magnetic field relative to the orientation of vehicle 10 corresponds to the three-dimensional vector as represented by one of data points. Data points are not updated when the magnetic field present at vehicle 10 does not correspond to a particular data point.

Several, but perhaps not all, of the data points in magnetic error table will be updated during each flight, depending on, for example, how many turns vehicle 10 makes, vehicle orientation, and the angles of inclination it flies through. After a number of flights, the twelve compensation coefficients are determined from the highly overdetermined 648 scalar values of the 216 data points, through well-known mathematical procedures, for example, utilizing a least squares determination.

Figure 4:
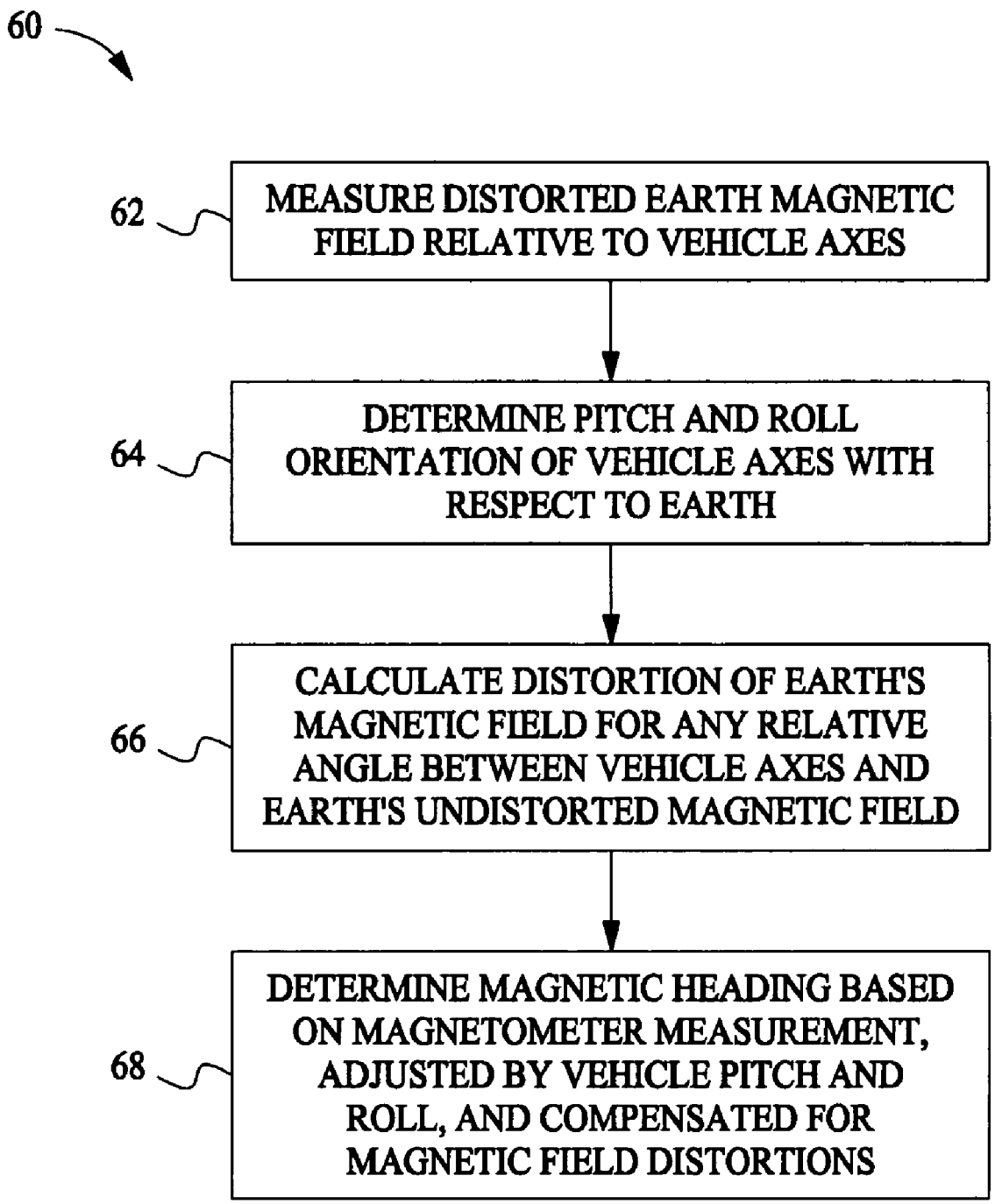
FIG. 4 is a flow diagram of a method for compensating a magnetometer for local disturbances in the earth's magnetic field.

In conjunction with the above, a method for compensating a magnetometer affixed to a vehicle is illustrated in flowchart 60 of FIG. 4. The method provides accurate magnetic heading information for a vehicle orientation. Referring to flowchart 60, a magnetometer 12 (shown in FIG. 1) is used 62 to measure a distorted earth magnetic field relative to axes of vehicle 10 (shown in FIG. 1), and a pitch and roll orientation of the axes of vehicle 10 is determined 64 with respect to the earth. A distortion of the earth's magnetic field for any relative angle between the vehicle axes and the earth's undistorted magnetic field is calculated 66 and a magnetic heading based on the magnetometer measurement, adjusted by the pitch and roll orientation of vehicle 10, and compensated for distortions of the earth's magnetic field is determined 68.

In a further embodiment, a Kalman filter model is developed to carry out the above described procedures, and which automatically calibrates the twelve parameters that make up the three dimensional magnetometer model for estimating the true earth's magnetic field from the field measured by magnetometer 12. This calibration method uses pitch, roll, heading, and position data from one or more of a GPS, AHRS, inertial reference system, inertial navigation system and ground based navigational aids (i.e., VOR, distance measuring equipment (DME)), along with a three dimensional map of the earth's magnetic field to generate the "truth" reference field vector. The difference between the magnetometer-measured field vector and the "truth" reference vector becomes the measurement for the Kalman filter. The Kalman filter then estimates corrections to the magnetometer model coefficients as well as corrections to the attitude and heading angles of the navigation system.

Figure 5:
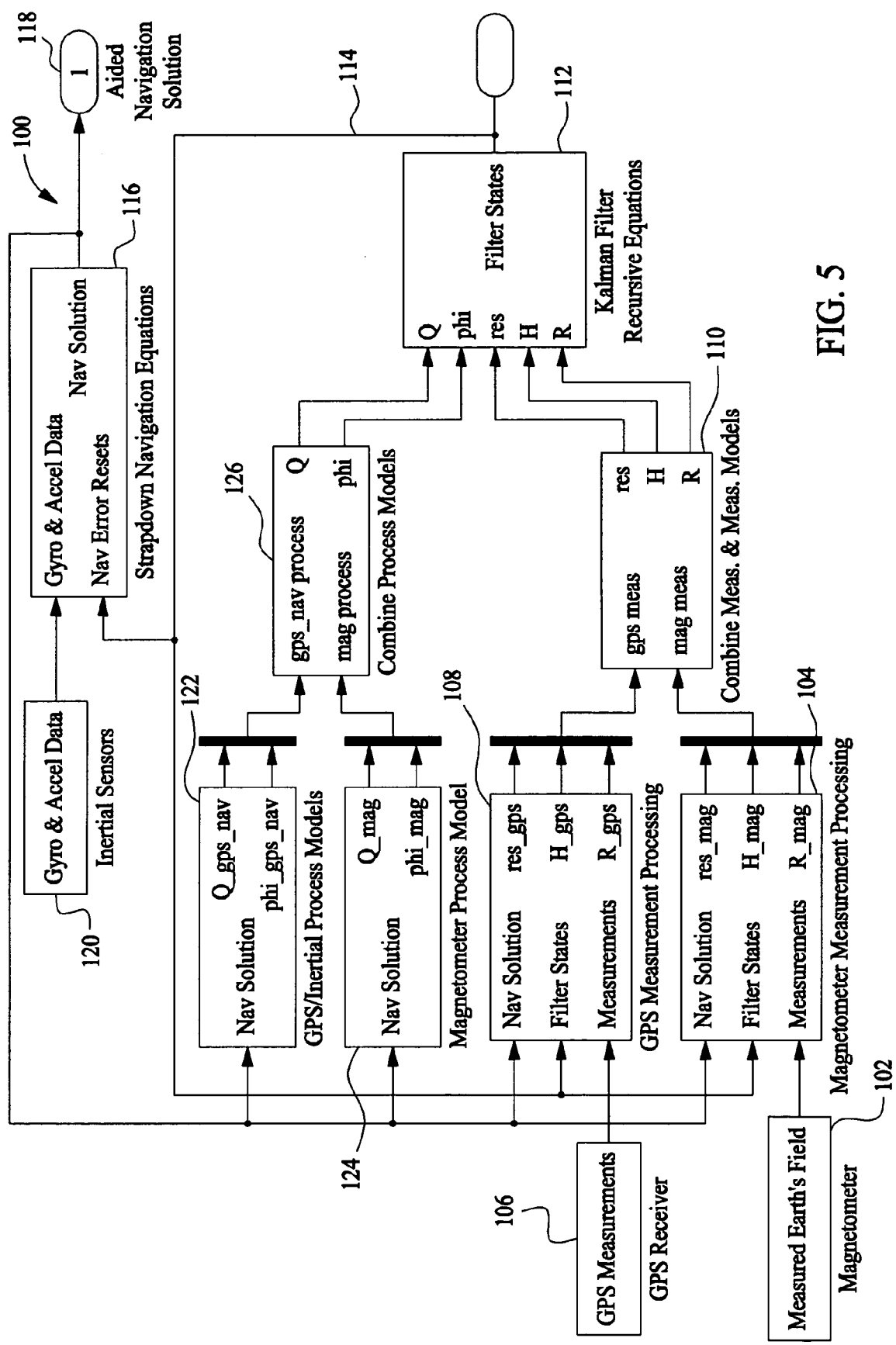
FIG. 5 depicts an overall structure of a magnetometer autocalibration and aiding process which utilizes Kalman filtering.

FIG. 5 depicts an overall structure 100 of the above described magnetometer auto-calibration and compensation process. Magnetometer 102 measures the earth's magnetic field and provides the measurements to a magnetometer measurement process 104. A GPS receiver 106 provides GPS measurements to a GPS measurement process 108. Although GPS receiver 106 is the only aiding source depicted in FIG. 4 besides magnetometer 102, other aiding sources may be utilized as well, such as barometeric altitude, airspeed, and other sources as previously described. Outputs from magnetometer measurement process 104 and GPS measurement process 108 are combined utilizing measurement model 110, whose outputs are input to Kalman filter 112.

Kalman filter 112 provides a filter state output 114 which is provided as an input to magnetometer measurement process 104 and GPS measurement process 108 as well as to navigation solution generator 116, which provides, in the embodiment shown, an aided navigation solution 118. Inertial sensors 120 also provide data to navigation solution generator 116. The aided navigation solution 118 is fed back as inputs to magnetometer measurement process 104 and GPS measurement process 108 as well as to a GPS/inertial process model 122 and a magnetometer process model 124. Outputs of GPS/inertial process model 122 and magnetometer process model 124 are input to a process model 126, whose output is input to Kalman filter 112.

In developing the Kalman filter model, a model of the field as measured by magnetometer 12 is utilized. Specifically, the field measured by the magnetometer $\tilde{h}_m$ is related to the true earth's field $\tilde{h}$ according to:

$$\tilde{h}_m = M\tilde{h} + \tilde{h}_p \tag{1}$$

where

M=3×3 magnetic permeability matrix $\tilde{h}_p$=3×1 vector of field offset errors resulting from permanent magnetization A tilde (~) is utilized to distinguish the magnetic field vectors from the Kalman filter measurement vector h which is described below.

By solving for $\tilde{h}$ the true field from the measured field is computed via $$\tilde{h} = M^{-1}(\tilde{h}_m - \tilde{h}_p) \tag{2}$$
$$= L(\tilde{h}_m - \tilde{h}_p)$$

where the matrix L is defined as $L=M^{-1}$. Comparing equation (2) above with the calibration equation from the first embodiment, (i.e. $h_{earth}=L_e*h_{meas}+h_{pe}$), it is seen that the two equations are equivalent if $L_e=L$ and $h_{pe}=-L\tilde{h}_p$. To develop the Kalman filter, it is assumed that the initial value of matrix L is equal to the identity matrix, and that the initial vector of field offset errors, $\tilde{h}_p$, is zero.

A linearized error equation for the magnetometer-measured and compensated body-axis earth's field components is obtained by taking partial differentials of equation (2). For example, $$\delta\tilde{h} = \delta L(\tilde{h}_m - \tilde{h}_p) - L\delta\tilde{h}_p \quad (3)$$
$$= \delta L\Delta\tilde{h} - L\delta\tilde{h}_p$$

where $\Delta\tilde{h}$ is defined as $$\Delta\tilde{h} = \tilde{h}_m - \tilde{h}_p.$$

Equation (3) provides a basic estimate of errors in a matrix format and is broken into three separate measurement equations (one for each field component), where each equation is in the form of a row (measurement mapping) vector multiplied by a column vector of magnetometer parameter errors to provide scalars that are functions of the vectors, for example, $$\delta\tilde{h}_x = \Delta\tilde{h}^T\delta l_{r1} - l_{r1}^T\delta\tilde{h}_p \quad (4)$$

$$\delta\tilde{h}_y = \Delta\tilde{h}^T\delta l_{r2} - l_{r2}^T\delta\tilde{h}_p \quad (5)$$

$$\delta\tilde{h}_z = \Delta\tilde{h}^T\delta l_{r3} - l_{r3}^T\delta\tilde{h}_p \quad (6)$$

where
$\delta l_{ri}^T$ = the $i^{th}$ row of $\delta L$
$l_{ri}^T$ = the $i^{th}$ row of L Alternatively, each term is written as a matrix times an error vector by defining the following 9×1 error vector $$\delta l = \begin{bmatrix} \delta l_{r1} \\ \delta l_{r2} \\ \delta l_{r3} \end{bmatrix} \quad (7)$$

Then, equation (3) can be re-written as $$\delta\tilde{h} = \begin{bmatrix} \Delta\tilde{h}^T & 0_{1\times3} & 0_{1\times3} \\ 0_{1\times3} & \Delta\tilde{h}^T & 0 \\ 0_{1\times3} & 0_{1\times3} & \Delta\tilde{h}^T \end{bmatrix} \delta l - L\delta\tilde{h}_p \quad (8)$$

which provides magnetometer errors.

To compute a GPS/AHRS-based or inertial navigation system-based "truth" field $\tilde{h}_i$, the earth's field vector is first determined in north/east/down frame components $\tilde{h}^N$ based on the current latitude, longitude, altitude, and (perhaps) time using an accurate model or map. Next the earth's field vector is transformed into body coordinates, to find errors in the "truth" source via the following transformations:

$$\tilde{h}_i = C_L^B C_N^L \tilde{h}^N \quad (9)$$

where $C_L^B$ transforms a vector from the local-level frame (L-frame) to the body frame (B-frame) and is the transpose of the attitude direction cosine matrix C, and $C_N^L$ accounts for the rotation in azimuth of the local-level frame with respect to north by the wander angle $\alpha$ and is given by $$C_N^L = \begin{bmatrix} \cos\alpha & \sin\alpha & 0 \\ -\sin\alpha & \cos\alpha & 0 \\ 0 & 0 & 1 \end{bmatrix}$$

By taking partial differentials of equation (9), $$\delta\tilde{h}_i = \delta C^T C_N^L \tilde{h}^N + C^T \delta C_N^L \tilde{h}^N + C^T C_N^L \delta\tilde{h}^N \quad (10)$$
$$= [C^T\{\gamma\}]C_N^L\tilde{h}^N + C^T[-\{\epsilon\}C_N^L]\tilde{h}^N + C^T C_N^L\delta\tilde{h}^N$$

where $\gamma$ is the attitude error vector which represents the angular error of the L-frame relative to the B-frame, $\epsilon$ the angular position error vector which represents the angular error of the L-frame relative to the earth frame (E-frame), and $\{v\}$ represents the skew-symmetric matrix form of the enclosed vector $v$ and is defined by $$\{v\} \equiv \begin{bmatrix} 0 & -v_z & v_y \\ v_z & 0 & -v_x \\ -v_y & v_x & 0 \end{bmatrix} \quad (11)$$

During the GPS-aided mode, the "psi-angle" inertial error model is implemented in the Kalman filter, shown below. In such an embodiment, the attitude error states are actually the three components of the angular error vector $\psi$ defined as $$\psi = \gamma - \epsilon \quad (12)$$

Using this substitution in equation (10), the first two terms combine to give yield following $$\delta\tilde{h}_i = C^T\{\psi\}C_N^L\tilde{h}^N + C^T C_N^L \delta\tilde{h}^N \quad (13)$$

To express each term in equation (13) as a matrix times an error vector, the first term must be re-arranged. The product of a skew-symmetric matrix form of a vector $v$ multiplied by a vector $u$ is the same as the cross product $v \times u$. By reversing the order of the cross-product, the sign is reversed. Therefore, $$\{\psi\}C_N^L\tilde{h}^N = \psi \times (C_N^L\tilde{h}^N) = -(C_N^L\tilde{h}^N) \times \psi = -\{C_N^L\tilde{h}^N\}\psi \quad (14)$$

and equation (13) is rewritten as $$\delta\tilde{h}_i = -C^T\{C_N^L\tilde{h}^N\}\psi + C^T C_N^L \delta\tilde{h}^N \quad (15)$$

The measurements to the Kalman filter are the differences between each of the magnetometer-derived earth's field components and the respective GPS/AHRS-derived earth's field components. These measurements can be processed one at a time or all at once. Each measurement equation is in the form of $$z_k = h_k^T x_k + v_k \quad (16)$$

Where $h_k$ is the measurement mapping vector at time $t_k$, $x_k$ is the state vector, and $v_k$ is white (uncorrelated) measurement noise. If all are processed at once, the measurement equation takes the form of $$z_k = H_k x_k + v_k \quad (17)$$

where $z_k$ is a 3×1 vector of measurements at time $t_k$, $H_k$ is a 3×n measurement matrix, and $v_k$ is the measurement noise vector.

By assuming that the three "psi-angle" attitude errors make up first three states and the twelve magnetometer parameters and the three earth field modeling errors make up the last fifteen states. The state vector is then written as $$x^T = [\psi^T \ldots \text{other nav/sensor states} \ldots \delta l^T \delta \tilde{h}_p^T (\delta \tilde{h}^N)^T] \quad (18)$$

The measurement vector is determined subtracting equation (15) from equation (8) and adding measurement noise $$z = \tilde{h} - \tilde{h}_i = \delta \tilde{h} - \delta \tilde{h}_i + v \quad (19)$$

$$= \begin{bmatrix} \Delta \tilde{h}^T & 0_{1\times 3} & 0_{1\times 3} \\ 0_{1\times 3} & \Delta \tilde{h}^T & 0 \\ 0_{1\times 3} & 0_{1\times 3} & \Delta \tilde{h}^T \end{bmatrix} \delta l - L \delta \tilde{h}_p + C^T \{C_N^L \tilde{h}^N\} \psi - C^T C_N^L \delta \tilde{h}^N + v$$

where v represents a vector of uncorrelated measurement noise due to electromagnetic noise and random earth field modeling errors such as quantization.

From equations (17), (18), and (19) it is shown that the measurement mapping matrix H is $$H = \begin{bmatrix} H_\psi & 0 & \cdots & 0 & H_{\delta l} & H_{\tilde{h}_p} & H_{\tilde{h}^N} \end{bmatrix} \quad (20)$$

where $$H_\psi = C^T \{C_N^L \tilde{h}^N\}$$

$$H_{\delta l} = \begin{bmatrix} \Delta \tilde{h}^T & 0_{1\times 3} & 0_{1\times 3} \\ 0_{1\times 3} & \Delta \tilde{h}^T & 0 \\ 0_{1\times 3} & 0_{1\times 3} & \Delta \tilde{h}^T \end{bmatrix}$$

$$H_{\tilde{h}_p} = -L$$

$$H_{\tilde{h}^N} = -C^T C_N^L$$

Barring any disturbance (such as lightning strikes), the magnetometer parameters are assumed to be very stable over time, therefore a reasonable model to describe random processes for each of these states is a Gauss-Markov process with a very long correlation time, in one embodiment, about 1000 hours. A reasonable one-sigma value for each of the nine $\delta L$ states is approximately 0.15 (15%), which corresponds to an angular error uncertainty of about 8.5°. A reasonable one-sigma value for each of the three offset errors contained in the vector $\delta h_p$ is 75 mgauss. Assuming an earth's field of 500 mgauss, this would again correspond to an angular error of about 8.5°. (The earth's field intensity ranges from about 250–650 mgauss). If a major disturbance does occur, it would be rather abrupt and would certainly be detected by standard Kalman filter residual screening.

A first-order Gauss-Markov process x is defined by the following $$\dot{x} = -\frac{1}{\tau} x + \sqrt{\frac{2\sigma^2}{\tau}} u(t) \quad (21)$$

where u(t) is unity white noise. The discrete-time model of this process is given by $$x_{k+1} = \Phi_k x_k + w_k \quad (22)$$

where $$\Phi_k = e^{-T/\tau}$$

$w_k$=Gaussian white noise sequence with variance=$\sigma^2(1-e^{-2T/\tau})$ $\sigma$=steady-state one-sigma value of the process
$\tau$=correlation time of the process
T=the discrete time interval between $t_k$ and $t_{k+1}$ The earth field modeling errors will vary as a function of position rather than time. Therefore, a Gauss-Markov process model which varies over distance traveled would be appropriate as such a model defines how state vectors vary over time. According to the National Geophysical Data Center (NGDC), local anomalies in geomagnetism which deviate from the International Geomagnetic Reference Field (IGRF) can exceed 10° of inclination and/or declination. In fact, Minnesota contains an extreme declination anomaly of 16° east in one area and 12° west just a few miles away—a change of 28 degrees. Over most of the world, however, the IRGF model is good to 0.5°. A reasonable one-sigma value to use to bound these larger anomalies might be 50 mgauss (corresponding to a 5.7 degree angular error for a 500 mgauss field) with a correlation distance of 10 nautical miles. Thus when cruising at 500 knots, the effective correlation time would be 72 seconds. However, during final approach at 150 knots an effective correlation time would be about four minutes.

The one-sigma measurement noise for the magnetometer is assumed to be on the order of 0.5 mgauss for each component which corresponds to an angular error of 0.06° for a 500 mgauss field.

The GPS/inertial process models are augmented by the fifteen process models associated with the magnetometer states to form the overall process model in matrix form $$x_{k+1} = \Phi_k x_k + w_k \quad (23)$$

where $\Phi_k$=state transition matrix=the undriven response over time $t_k$ to $t_{k+1}$ $w_k$=process noise vector=driven response to the white noise input over time $t_k$ to $t_{k+1}$ The magnetometer measurements may be processed independently or along with other aiding measurements such as GPS by augmenting the measurement vector z with these three additional measurements. Likewise, the measurement matrix H would also be augmented with these three additional rows. Standard Kalman filter time propagation and measurement update equations are iterated using known methods. For example, the estimated state vector $\hat{x}_k$ and its associated error noise covariance matrix $P_k$ are projected forward to the next time step as follows $$\hat{x}_{k+1}^- = \Phi_k \hat{x}_k \quad (24)$$

$$P_{k+1}^- = \Phi_k P_k \Phi_k^T + Q_k \quad (25)$$

where $\hat{x}_{k+1}^-$=estimated error state vector prior to the measurement update at time $t_{k+1}$ $P_k = E[\hat{x}_k \hat{x}_k^T]$=error covariance matrix after the measurement update at time $t_k$ $Q_k = E[w_k w_k^T]$=process noise covariance matrix over time $t_k$ to $t_{k+1}$ $P_{k+1}^-$=the error covariance matrix prior to the measurement update at time $t_{k+1}$ and the estimated state vector and the error covariance matrix are updated for the new measurement vector $z_k$ according to $$K_k = P_k^- H_k^T (H_k P_k^- H_k^T + R_k)^{-1} \quad (26)$$

$$\hat{x}_k = \hat{x}_k^- + K_k (z_k - H_k \hat{x}_k^-) \quad (27)$$

$$P_k = (I - K_k H_k) P_k^-  \quad (28)$$

where $R_k = E[v_k v_k^T]$ = measurement noise covariance matrix at time $t_k$.

Figure 6:
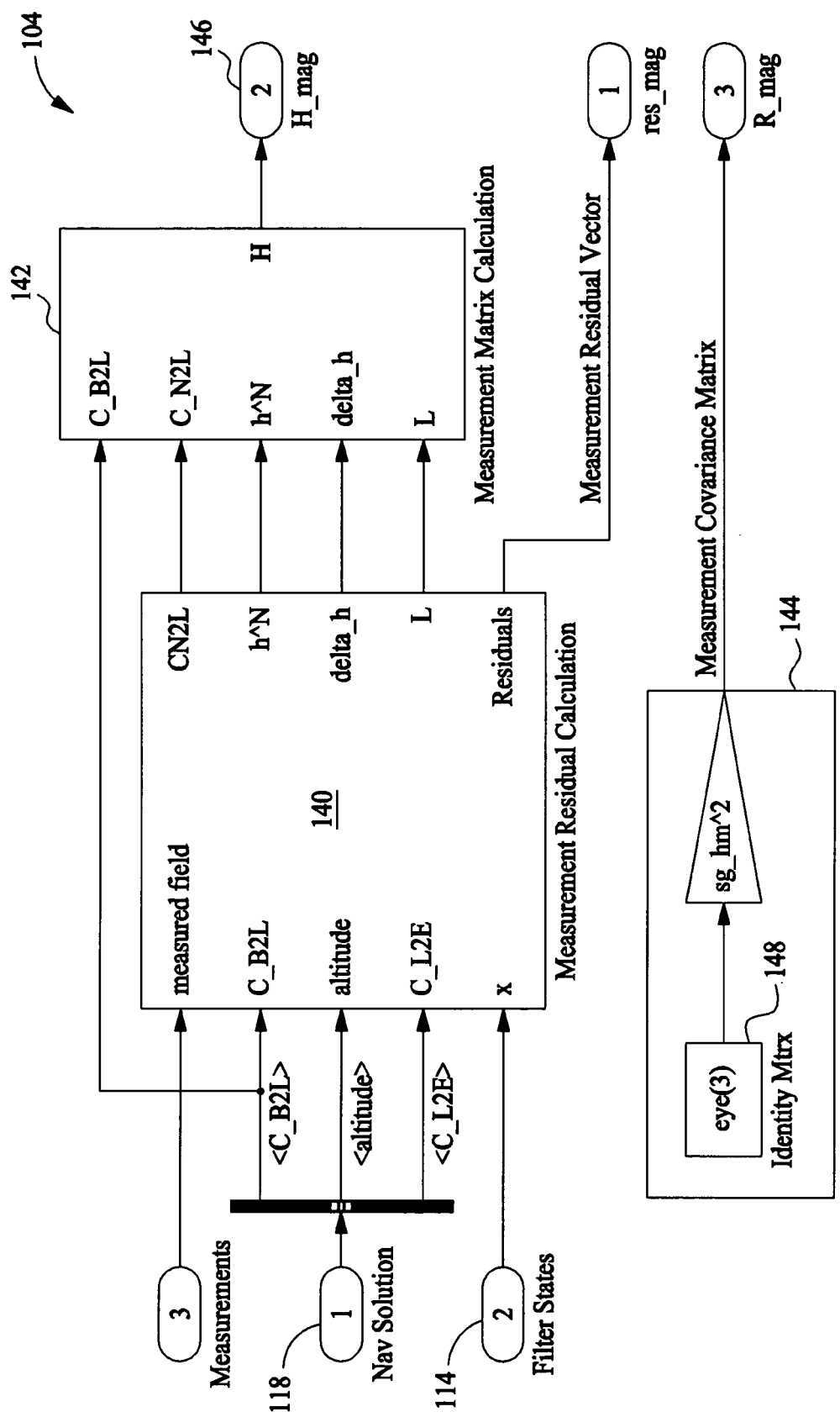
FIG. 6 illustrates magnetometer processing as three functions: a measurement residual calculation, a measurement matrix calculation, and a measurement covariance matrix calculation.

FIG. 6 is a detailed illustration of one embodiment of magnetometer measurement process 104, which includes three functions, a measurement residual calculation 140, a measurement matrix calculation 142, and a measurement covariance matrix calculation 144. To calculate measurement residuals, measurement residual calculation 140 receives as inputs, measured earth's magnetic field as measured by magnetometer 102 (shown in FIG. 5), filter state output 114 from Kalman filter 112 (shown in FIG. 5) and aided navigation solution 118 (also shown in FIG. 5). Measurement matrix calculation 142 utilizes results of residual calculations made in residual calculation 140 to provide a magnetic field matrix output 146. Measurement covariance matrix calculation 144 is based on an identity matrix 148.

Figure 7:
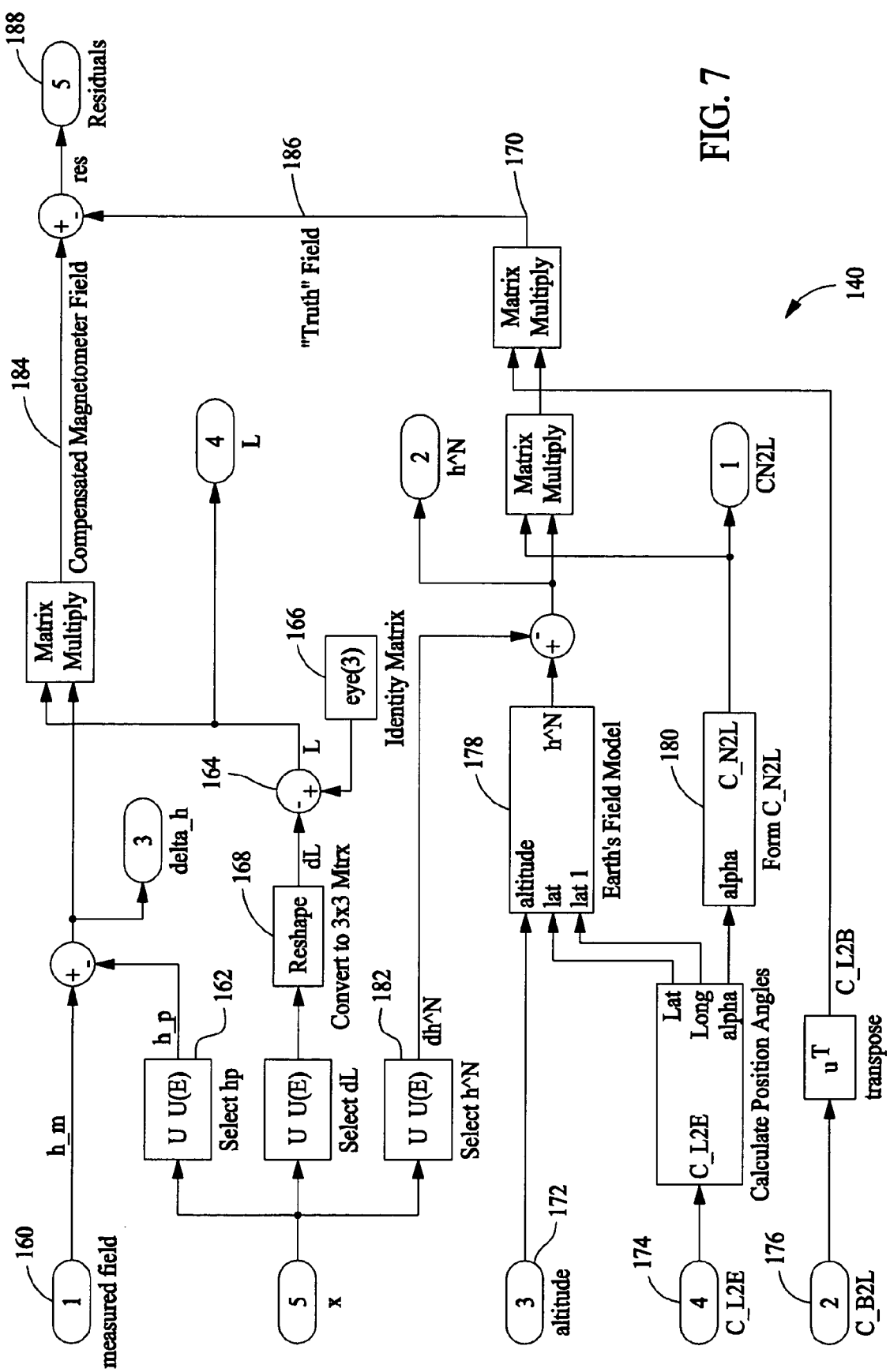
FIG. 7 details the measurement residual calculation of FIG. 6.

FIG. 7 illustrates measurement residual calculation 140 (also shown in FIG. 6). Measured earth magnetic field 160 is first compensated using the current estimates of $\delta \bar{h}_p$ 162 and L 164, an inverse of the permeability matrix M. Note that a nominal value for L 164 is assumed to be identity matrix 166. The matrix $\delta L$ 168 is an estimate of the error from this nominal identity matrix 166 and an estimate of the errors from magnetometer 12, $\delta L$, are subtracted from it to yield a current estimate of L 164. The magnetic "truth" field 170 (an inertial model of the earth's field) is computed from current estimates of altitude 172, position 174, and current date and time 176 using earth's field model 178 and current earth-to-local-level frame and local-level-to-body frame transformations 180 and is corrected for the earth field modeling error estimate $\delta \bar{h}^N$ 182. Since the measured field vector 184 and truth reference vector 186 are corrected explicitly (and the attitude error is reset in the strapdown navigation equations) with the state vector estimate from the filter, the difference between the two corrected field vectors 184 and 186 becomes the measurement residual vector 188 ($z_k - H_k \hat{x}_k^-$) of equation (27).

Figure 8:
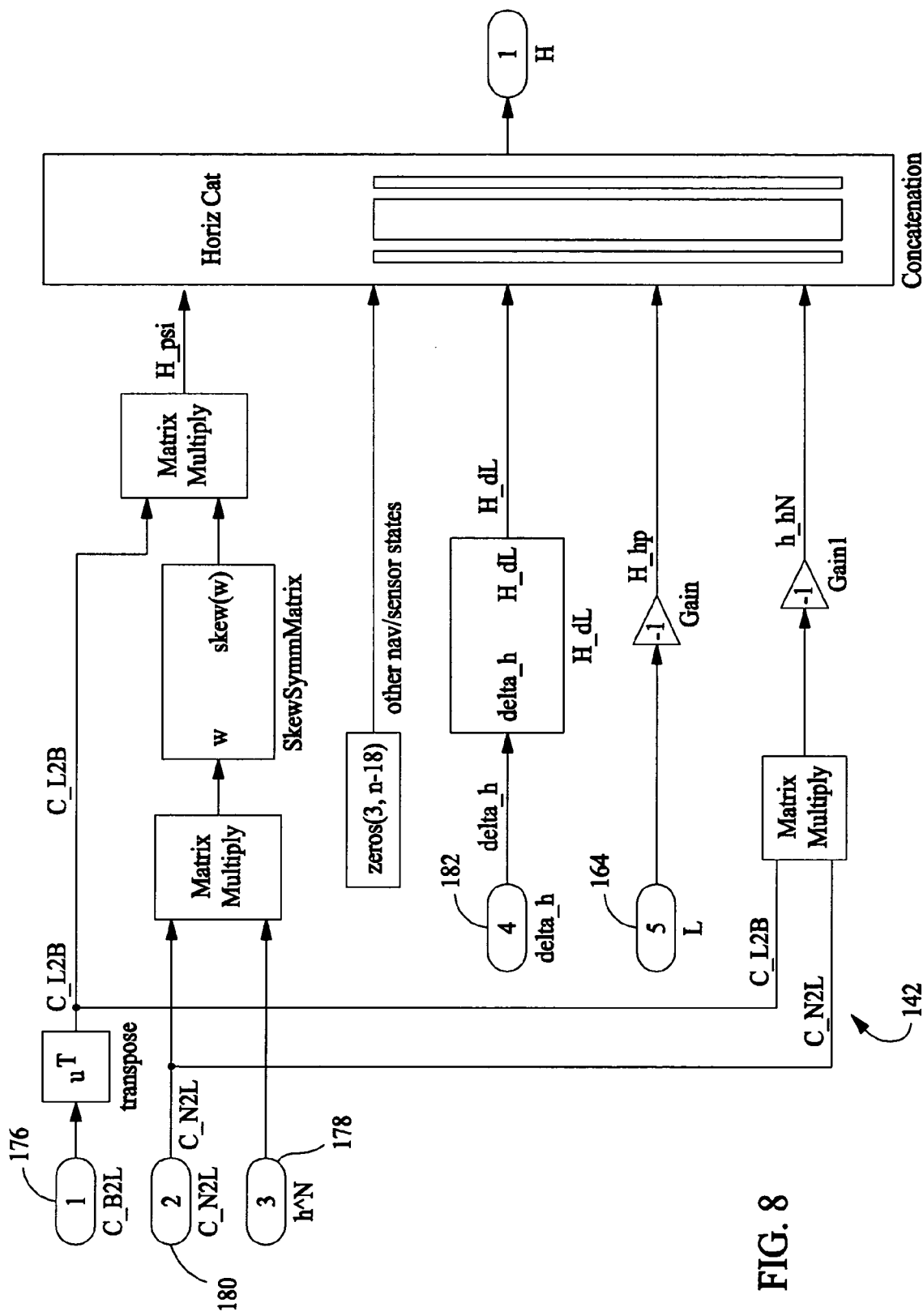
FIG. 8 details the measurement matrix calculation of FIG. 6.

FIG. 8 illustrates measurement matrix calculation 142 which provides a solution of equation (20), which is described above. Current date and time 176 is input as are local level transformations 180 and a modeled earth magnetic field 178. Also input to measurement matrix calculation 142 are earth field modeling error estimate $\delta \bar{h}^N$ 182 and L 164, an inverse of the permeability matrix M. An output of measurement matrix calculation 142 is the measurement mapping matrix H.

Figure 9:
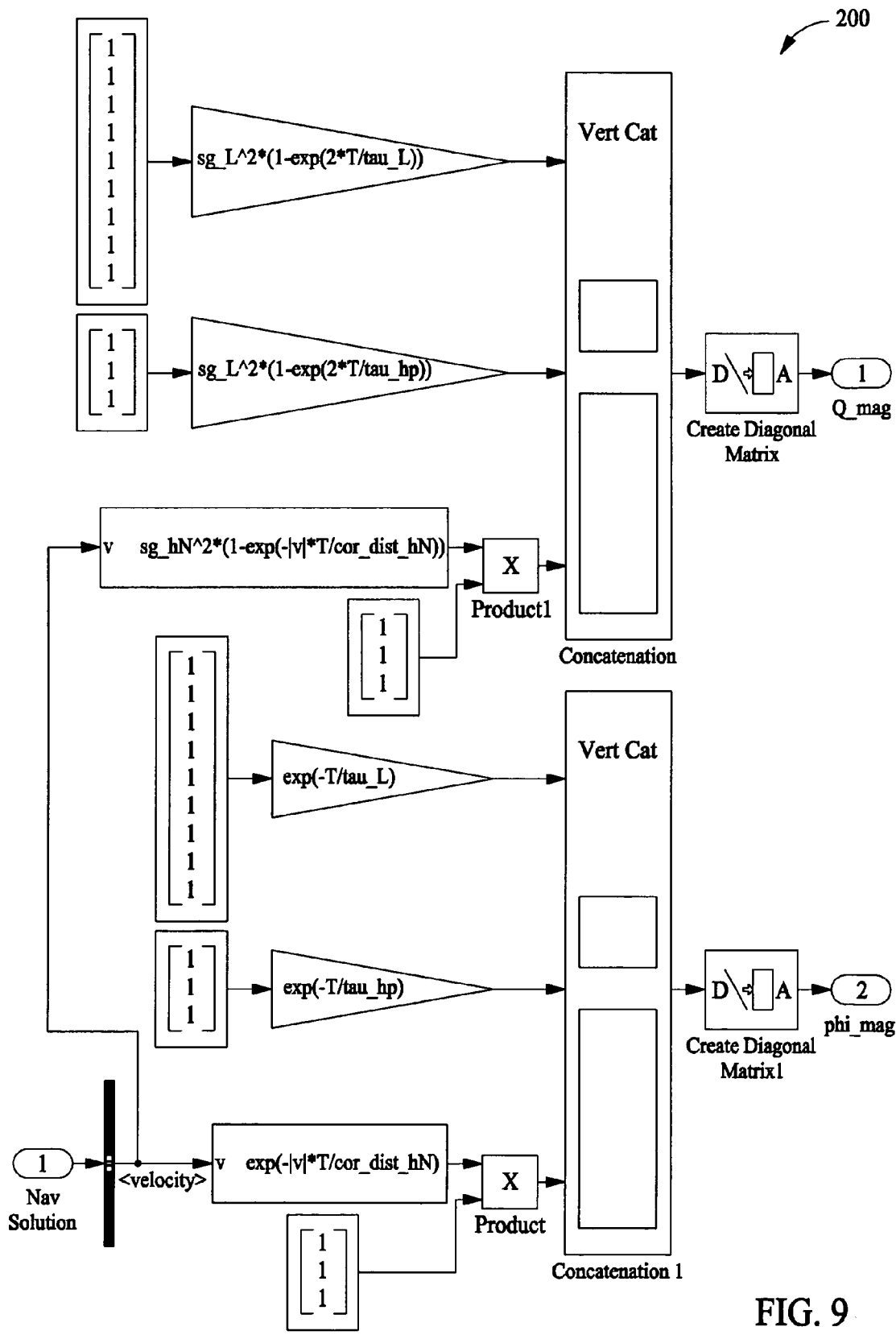
FIG. 9 illustrates a magnetometer process model.

FIG. 9 shows a magnetometer process model 200 which results in calculation of $\Phi_k$, the state transition matrix described with respect to equation (23) above, and $Q_k$ the process noise covariance matrix over time, as described with respect to equation (25), for the magnetometer states.

While described specifically in terms of a magnetometer and three-dimensional magnetic compensation, it is to be understood that the above described methods and apparatus are at least partially applicable to magnetic detection devices other than magnetometers, and further applicable to automatic magnetic compensations in less than three dimensions.

In particular, and in one specific embodiment, a magnetic detection device such as a flux valve or other gimbaled magnetic detection device is utilized in characterizing distortions in the earth's magnetic field caused by the horizontal axis of the vehicle in which the flux valve is installed. In the embodiment, the distorted magnetic field in the horizontal axis of the vehicle is repeatedly measured utilizing the magnetic detection device (e.g., the flux valve), and heading of the vehicle axes with respect to the earth at a time of each magnetic measurement obtained. A magnetic compass compensation unit, similar to magnetic compass compensation unit 16 (shown in FIG. 1), is configured to receive undistorted horizontal earth magnetic field data for the vicinity of the vehicle relative to the earth at the time of each magnetic detection device measurement. The magnetic compass compensation unit is further configured to utilize the magnetic field measurements, the true heading of the vehicle, and the horizontal undistorted earth magnetic field data to characterize horizontal distortions caused by either or both of the vehicle and errors within the magnetic detection device.

Two dimensional compensation is simplified, if the compensation process is inhibited while the vehicle is not in a nearly horizontal orientation. More specifically, pitch and roll signals available from the aircraft are utilized to inhibit compensation when the airplane is substantially pitched or rolled. Inhibiting magnetic compensation during substantial pitch and roll maneuvers enhances accuracy of the magnetic compensation system. Similarly, in another embodiment, magnetic compensation is inhibited during acceleration or turning maneuvers also to improve accuracy of the compensation.

Inhibiting compensation during pitch, roll, acceleration, and turning maneuvers allows the compensation methods described to also work with gimbaled devices, for example, flux valves, that are locally level when the aircraft is not performing one of the above listed maneuvers. In such an embodiment, direction of the magnetic field of the Earth is also measured in a local-level axis. In another specific embodiment, only the direction of the magnetic field of the Earth in the horizontal axis of the vehicle is measured.

While the above described systems and methods are sometimes described in terms of utilizing data from a GPS, it is to be understood that the systems and methods may be utilized with other systems that provide position information, including, but not limited to, a global navigation system (GNS) or other satellite navigation system such as GLONASS, and radio navigation aids such as VOR and distance measuring equipment (DME) which are also sometime referred to as ground based navigational aids.

Once the twelve compensation components are determined, either through Kalman filtering, or through population of the magnetic error table, unit 16 is configured to remove local disturbances to the earth's magnetic field. Once the local disturbances are removed, accurate navigation of an aircraft or other vehicle is attained since the magnetic heading information supplied to the pilot is a true magnetic heading, uncompromised by local magnetic disturbances.

The above described methods and apparatus illustrate how magnetometer readings can be automatically compensated to remove local disturbances in the earth's magnetic field based upon data received from, for example, an inertial navigation system. While the invention has been described in terms of various specific embodiments, those skilled in the art will recognize that the invention can be practiced with modification within the spirit and scope of the claims.

What is claimed is:

1. A method for characterizing distortions in the earth's magnetic field caused by a vehicle, a magnetic detection device affixed to the vehicle, said method comprising:
   repeatedly measuring the distorted magnetic field utilizing the magnetic detection device;

obtaining a heading of the vehicle axes with respect to the earth at a time corresponding to each magnetic field measurement;

receiving undistorted earth magnetic field data for the vicinity of the vehicle relative to the earth at the time of each magnetic field measurement; and utilizing the magnetic field measurements, a true heading of the vehicle, and the undistorted earth magnetic field data to characterize distortions caused by one or more of the vehicle and magnetic detection device errors.

2. A method according to claim 1 wherein the magnetic detection device is one of a magnetometer, a gimbaled magnetic detection device, and a flux valve.

3. A method according to claim 1 further comprising inhibiting at least one of the measurements of the distorted magnetic field and the characterization of distortions when the aircraft is not in a substantially horizontal orientation.

4. A method according to claim 3 further comprising utilizing pitch and roll signals to determine when to inhibit the at least one of distorted magnetic field measurements and characterization of distortions.

5. A method according to claim 1 further comprising inhibiting the at least one of distorted magnetic field measurements and characterization of distortions while the vehicle is accelerating.

6. A method according to claim 1 further comprising inhibiting the at least one of distorted magnetic field measurements and characterization of distortions while the vehicle is turning.

7. A method according to claim 1 comprises repeatedly measuring the distorted magnetic field further comprises repeatedly measuring the distorted magnetic field in the horizontal axis of the vehicle.

8. A method according to claim 1 comprises repeatedly measuring the distorted magnetic field further comprises repeatedly measuring the distorted magnetic field in a local level axis.

9. A method according to claim 1 wherein receiving undistorted earth magnetic field data comprises:

determining vehicle position; and accessing a table of magnetic inclination and declination data for a surface of the earth.

10. A magnetic compass compensation unit for characterizing distortions in the earth's magnetic field caused by a vehicle in which said unit is mounted, the distortions relative to an undisturbed magnetic field of the earth, said unit comprising:

a magnetic detection device; and a processor configured to receive measurements of the distorted magnetic field from said magnetic detection device, obtain a heading of the vehicle axes with respect to the earth at a time corresponding to each said magnetic detection device measurement, receive undistorted earth magnetic field data for the vicinity of the vehicle relative to the earth at the time corresponding to each said magnetic detection device measurement, and characterize the distortions utilizing the magnetic field measurements, true heading of the vehicle, and the undistorted earth magnetic field data.

11. A magnetic compass compensation unit according to claim 10 wherein said magnetic detection device comprises one of a flux valve and a magnetometer.

12. A magnetic compass compensation unit according to claim 10, said processor configured to inhibit at least one of the measurements of the distorted magnetic field and the characterization of distortions when the aircraft is not in a substantially horizontal orientation.

13. A magnetic compass compensation unit according to claim 10, said unit configured to receive pitch and roll data, said processor configured to utilize the pitch and roll signals to determine when to inhibit the at least one of the distorted magnetic field measurements and characterization of distortions.

14. A magnetic compass compensation unit according to claim 10, said processor configured to inhibit the at least one of distorted magnetic field measurements and characterization of distortions while the vehicle is accelerating or turning.

15. A magnetic compass compensation unit according to claim 10, said unit configured to measure the distorted magnetic field in the horizontal axis of the vehicle.

16. A magnetic compass compensation unit according to claim 10, said unit configured to measure the distorted magnetic field in a local level axis.

17. A magnetic compass compensation unit according to claim 10 wherein to receive undistorted earth magnetic field data, said unit is configured to:

receive a vehicle position; and access a table of magnetic inclination and declination data for a surface of the earth to determine the magnetic field data for the vehicle position.

18. A magnetic compass compensation unit according to claim 10 wherein to characterize the distortions, said processor is configured to calculate correction coefficients based upon one or more of a magnetic detection device orientation with respect to the vehicle axes, the magnetic field as measured by the magnetic detection device, magnetic inclination data for current vehicle position, magnetic declination data for current vehicle position, and a vehicle orientation.

19. A magnetic compass compensation unit according to claim 10 said processor is configured to determine a vehicle orientation based upon at least one of a received GPS tracking angle, a true heading calculated utilizing one or more of satellite navigation system augmented attitude and heading reference system algorithms, at least one of a true heading signal or a magnetic heading signal from an inertial reference system, a true heading received from a dual antenna satellite navigation system, and position information received utilizing ground based navigational aids.

20. A magnetic compass compensation unit according to claim 10 wherein said processor is configured to transform undistorted earth magnetic field data to correspond to axes of the magnetic detection device.

21. A method for determining a true earth magnetic field from a magnetic field measured by a magnetic detection device, said method comprising:

generating a truth reference field vector from sources of pitch, roll, heading, and position independent of the magnetic detection device and a map of the earth's magnetic field;

determining a difference between a vector as measured by the magnetic detection device and the truth reference vector; and utilizing the difference to estimate corrections to model coefficients.

22. A method according to claim 21 wherein pitch, roll, and heading data is provided through utilization of at least one of a satellite navigation system, an attitude and heading reference system, an inertial reference system, an inertial navigation system, and position information from ground based navigational aids.

* * * * *